3,236,914
METHOD FOR RENDERING POLYMERS COMPATIBLE
James David Murdock, Montee des Trentes, Norman Nelan, Otterburn Park, and Gordon Hart Segall, Montee des Trentes, Quebec, Canada, assignors to Canadian Industries Limited, Montreal, Quebec, Canada, a corporation of Canada
No Drawing. Filed May 2, 1960, Ser. No. 25,832
Claims priority, application Great Britain, May 12, 1959, 16,275/59
8 Claims. (Cl. 260—857)

This invention relates to synthetic polymeric materials and, more particularly, to homogeneous blends of synthetic rubbery copolymers and resinous saturated polymers.

Synthetic rubbery copolymers of butadiene-1,3, isoprene etc. and copolymerizable unsaturated compounds, which are generally polymerizable compounds containing a single olefinic double bond, constitute a well known class of compounds. They are characterized chemically by the fact that they are high molecular weight mainly linear polymers having a high degree of unsaturation, and are characterized physically by a resemblance to natural rubber and their capacity for vulcanization by heating with sulphur. Such polymers include those of butadiene with styrene, acrylonitrile, methyl methacrylate and similar materials.

Other synthetic rubbery copolymers include butyl rubbers, being copolymers of isobutylene and a small amount of isoprene, acrylic rubbers such as poly(ethyl acrylate), neoprenes such as poly 2-chlorobutadiene-1,3, and silicone rubbers.

Another class of synthetic polymeric materials, quite different in properties from the rubbery copolymers, consists of the hard, solid resinous saturated polymers of unsaturated compounds containing an olefinic double bond connected to a methylene group. These materials are also of high molecular weight and are mainly linear polymers, but they differ from the rubbery copolymers in that they have a low degree of unsaturation and are hard and frequently brittle. Typical members of this class are polystyrene, poly(methyl methacrylate), polyvinylchloride, and other saturated substantially linear polymers such as polyethylene and polypropylene. This class is not, of course, restricted to homopolymers, and the hard, resinous polymers also include copolymers of, for example, styrene and methyl methacrylate with minor proportions of butadiene, in which latter case a small amount of unsaturation is introduced.

It has heretofore been proposed to form blends of certain of the rubbery copolymers of the first of the above-described classes with certain of the hard saturated polymers of the second class. Such blended compositions are useful as thermoplastic molding materials, and give molded products having good resistance to impact. The mixing has normally been attempted by mastication on a mill or an internal mixer, but with a few exceptions, this practice has met with little success. In the majority of instances the materials are not compatible with one another, and as a result are not only very difficult, or in some cases impossible, to blend together, but also the resulting blend obtained is weaker and less desirable than either of the materials alone. In a few instances, however, such as when a butadiene-1,3/acrylonitrile rubbery copolymer is blended with a vinyl resinous copolymer such as a styrene/acrylonitrile copolymer, the materials are compatible with one another and homogeneous blends possessing properties more desirable than either of the constituents are obtained.

However, in the majority of cases, it has not hitherto proved possible to blend rubbery copolymers with hard saturated resinous polymers by mixing the bulk materials in a mill or a mixer, such as the Banbury mixer. It has therefore been necessary to use more involved procedures such as, for example, polymerizing an emulsion of one or more monomers in the presence of an emulsion of another preformed polymer. Such procedures have been disclosed, for example, in British Patents Nos. 637,388 and 766,686.

It is an object of this invention to provide a process for blending homogeneously, in a wide range of proportions, synthetic polymers which have hitherto been regarded as incompatible. Another object is to provide a process for blending synthetic rubbery copolymers and synthetic hard resinous polymers at an elevated temperature in a device such as a mill. A still further object is the provision of thermoplastic blended molding compositions which can be molded to form products which are strongly resistant to fracture on impact and which have high heat distortion temperatures. Additional objects will appear hereinafter.

The process of this invention comprises masticating together at least one substantially linear synthetic polymer containing atoms selected from the group consisting of basic nitrogen atoms and amido nitrogen atoms, and at least one substantially linear synthetic copolymer containing from 2 to 50 parts by weight of a monomer providing free carboxylic acid groups in the copolymer and from 98 to 50 parts by weight of at least one neutral monomer.

The resultant homogeneous blends of synthetic polymeric materials have many advantageous properties and in the case of blends of rubbery copolymers and resinous copolymers in the proportions discussed hereinafter, have particular utility as high impact molding resins of improved thermal rigidity.

The substantially linear nitrogen-containing synthetic polymers suitable for use in the process of this invention include both addition polymerisation polymers, e.g. vinyl chloride and acrylic copolymers, and polycondensation polymers such as polyamides, and obviously exclude naturally occuring nitrogen-containing materials such as proteins and the condensation products of formaldehyde with urea or melamine. Suitable polycondensation polymers are polyamides, including polyester-polyamide copolycondensates, and amongst the polyamides may be particularly mentioned polyhexamethylene adipamide, polyhexamethylene sebacamide and polycaprolactam. When the nitrogen-containing polymers are addition polymerisation polymers, it is preferred that they be copolymers of a minor molar percent, i.e. not more than 50 molar percent, of monomers containing basic nitrogen atoms or amide nitrogen atoms. Examples of monomers containing basic nitrogen atoms are 2-vinylpyridine, 4-vinylpyridine and N:N-dimethylaminoethyl methacrylate, and examples of monomers containing amido nitrogen atoms are acrylamide, methacrylamide, crotonamide, vinyl phthalimide and, less desirably, N-substituted acrylamides such as N-tert. butyl acrylamide and di-N-ethyl acrylamide, and vinyl pyrrolidone.

In the substantially linear acid-containing synthetic copolymers, suitable monomers providing free carboxylic acid groups are copolymerisable alpha-beta unsaturated acids such as acrylic, methacrylic, crotonic, maleic, fumaric, or itaconic acids. Alternatively, acid groups may be provided by chemical reaction after polymerization, for example by hydrolysis of the ester groups of a copolymerizable ester.

In the nitrogen-containing addition polymers and in the acid-containing copolymers, monomers other than those mentioned above which may be used in their production are hereinafter referred to as "neutral" monomers. They are of necessity copolymerizable, and are neutral in the sense that they contain neither carboxylic acid groups nor basic or amido nitrogen atoms. Such neutral polymerizable monomers may have a single ethylenic double bond, or they may have conjugated double bonds. Of the former may be mentioned ethylene, propylene, vinyl chloride, vinylidene chloride, styrene, alkylated styrenes, methyl isopropenyl ketone, methyl vinyl ketone, vinyl acetate and methyl, ethyl, propyl, butyl and other lower alkyl acrylates, methacrylates and chloroacrylates. Of the latter may be particularly mentioned butadiene, isoprene and chloroprene. Mixtures of such monomers, with or without monomers which can only be copolymerised, may also be used, e.g. mixtures of vinyl chloride with vinyl acetate or diethyl fumarate, mixtures of methyl methacrylate with ethyl acrylate, mixtures of styrene with acrylonitrile or methacrylonitrile and mixtures of butadiene with styrene, methyl methacrylate, acrylonitrile or methacrylonitrile. Said other neutral monomers must be different in the nitrogen-containing addition polymers and the acid-containing copolymers, since it is well known that, for example, a polystyrene is compatible with another polystyrene whether or not one contains an acid and the other a basic comonomer.

It is a particular feature of this invention that pairs of linear polymers hitherto regarded as incompatible, may now be blended with each other if one is modified by copolymerisation to form a nitrogen-containing copolymer and the other is modified by copolymerisation to form an acid-containing copolymer. Thus the advantages of the invention are restricted to resin-resin and resin-rubber blends, i.e. at least one of the polymeric materials should be a resin as described hereinbefore, for it is known that any two rubbery copolymers are very likely to be already compatible, since each will normally contain a major proportion of butadiene. It is, however, already known that there are a few instances of limited compatibility between specific rubbery and resinous polymers. In these cases the inclusion of the specified monomers to give a blend within the scope of this invention produces properties different from, and in many cases superior to, the properties of the constituent polymers and the prior known blends. In particular, it has been found that the polymers are more easily blended together and the blends frequently have higher softening points.

It is to be particularly noted that the invention is not to be limited to the inclusion of a particular class of monomer in a particular class of linear copolymer. Thus, in a blend of a rubbery copolymer with a hard saturated resin, the rubbery copolymer may include either the nitrogen-containing or the carboxylic acid-containing monomer, and the saturated resin must include the other specified monomer. Similarly in a blend of two hard resins such as polystyrene and poly(methyl methacrylate), hitherto not believed capable of blending, the styrene may be copolymerised with either the basic or the acidic monomer, and the methyl methacrylate with the remaining other specified monomer. By "specified" monomers are meant the nitrogen-containing or carboxylic acid-containing monomers described above in connection with the acid-containing copolymers and nitrogen-containing addition copolymers.

As stated above, by means of this invention, substantially linear polymers of such widely different cohesive energy densities that they are not compatible may be modified by copolymerisation to provide linear copolymers also of widely different cohesive energy densities which are compatible. It is found, however, that such compositions are most readily and effectively blended to usefully homogeneous compositions if each polymer is modified by copolymerisation so as to cause the cohesive energy densities of the copolymers to be nearer together than were the densities of original polymers, rather than the reverse. It is particularly desirable that the polymers have similar cohesive energy densities when the nitrogen atom in one of them is in a di-N-substituted amide group.

The amounts of the specified monomers which are to be included in the copolymers for blending according to this invention may be varied widely. If the polymers without said monomers are compatible or nearly so, the inclusion of as little as 1% by weight of the specified monomers does in many cases bring some improvement in properties such as ease of blending. However, in most cases a minimum of 2% of the specified monomers is required to give noticeable improvement in the properties of the final blend, and 2% is therefore the minimum desirable proportion. In other cases, where the modified polymers are highly incompatible, 5% or 10% or more of the specified monomers is required. The minimum specified monomer necessary in each case depends to some extent on the efficiency of the mixing equipment and the properties desired, and may be determined by experiment for any polymer blend within the scope of this invention. It is often not necessary to include only the minimum amount of the specified monomers: greater amounts in some cases give added advantages such as increased stiffness and higher softening point. However, in order to avoid compositions of relatively high water absorption and cost, minimum amounts of the specified monomers are normally used. It is also not necessary that the amounts of specified monomers included in two blended copolymers exactly balance: in certain cases, there may be advantages, such as improved printability or adhesion properties, in leaving a residual excess of, for example, carboxylic acid groups in the resulting blend. Furthermore, in certain cases, a copolymer containing minor amounts of both types of specified monomer may be prepared, and such a copolymer will blend with other copolymers containing either type of specified monomer.

The compatible polymers of this invention may be blended together by mastication in any proportion so as to yield, for example, a blended polymeric composition containing 1 to 99% by weight of either polymer. However, considerable improvement in properties will usually only be obtained when about 5% or more of one polymer is blended with 95% or less of the other. Moreover, certain compositions of this invention in particular certain homogeneous blends of resinous and rubbery copolymers, have particularly advantageous properties when used for molding or extrusion since giving products of high impact resistance and good thermal rigidity. (These properties are measured respectively by the well-known Hounsfield impact test and Vicat softening point.) For many purposes it is desirable that the Hounsfield value should be above 0.1 and the Vicat above 80° C. Such compositions are most usually obtained in the rubber-resin blends of this invention when the compositions contain from 50% to 90% by weight of the resinous copolymer, and the amount of the specified acid monomer is between 4% and 12% by weight of the copolymer which contains it, and the amount of the monomer yielding basic or amido nitrogen atoms lies between 5% and 15% by weight of its copolymer.

It has been said herein before that the homogeneous polymer blends of this invention are prepared by masticating together the individual polymers or copolymers containing the carboxylic acid groups and the basic or amido nitrogen atoms. By masticating is meant any process of mixing the polymers by doing work upon them whereby a homogeneous blend results from compatible materials. Such masticating may be done, for example, on an open roll mill preferably, but not essentially, heated, or in an internal mixer such as a Banbury mixer or a mixing extruder.

The linear addition copolymers described above, both of the hard resinous and the rubbery types, may be prepared by any of the known methods of bulk, pearl, or emulsion polymerization. The details of these methods are described hereinafter with specific examples, but it is particularly important to note that the advantageous products of this invention cannot be made by the sole method of blending latices of suitable copolymers. The products of such blending, when coagulated and dried, are inescapably characterized by the presence of small regions of material of differing chemical constitution corresponding to the original latex particles. Mastication is necessary; in the case of readily compatible materials only slight mastication may be needed, and may be provided even by the process of extrusion of dried mixed latices during the formation of molded articles. Less compatible materials may be prepared as latices and mixed, and subsequent processes such as densification or cutting into particles, or the mixing in of ingredients such as stabilizers, dyes or pigments will frequently give sufficient mastication to form the homogeneous blends of advantageous properties claimed in this invention.

Thus the addition copolymers to be used in the process and blended compositions of this invention, if prepared by any of the above methods, may be separated and dried (if necessary) and subsequently masticated together. Alternatively, if the copolymers are prepared in emulsion, the emulsion may be mixed and coagulated and the product dried. In the latter case, however, at least some further mastication will be required.

The homogeneous polymer blends of this invention, which are to be used for molding, may contain antioxidants, pigments, fillers, lubricants, etc., and may be used most suitably in granular or sheet form. Granules are suitable for injection, extrusion and compression molding, and are best obtained by converting the compositions into the form of rods or thin sheets and then cutting them into small particles. The compositions may be obtained in the form of sheets either by extrusion or by the bonding together of many thin calendered sheets. Molded shapes may be obtained from flat sheets by heating the flat sheets and drawing or pressing them against a former.

Although the polymeric materials used in this invention have been referred to herein as "substantially linear," the word "substantially" is intended to distinguish the polymers from those such as vulcanized rubbers which consist of three dimensional networks, and does not exclude a small amount of cross-linking in the polymers used in this invention. Particularly when rubber-resin blends are to be extruded, it has been found that a small amount of cross-linking in the rubbery copolymers gives smoother extrudates. Such cross-linking can be provided by several means known to the art, such as the addition of a small amount of difunctional monomer in the polymerization, e.g. 0.1 to 5.0% of divinyl benzene, or the gentle milling of the rubbery copolymer, for example at 145° to 160° C. for 30 to 90 minutes. In general, when the compositions are to be used for extrusion purposes, it is preferred that the rubbery copolymers should have a fraction of at least 70% by weight of material insoluble in 2-butanone after extraction for 24 hours at 20° C.

The advantages of the polymer blends of this invention will be made clearer by the following examples, which are, however, only illustrative of the invention and in no manner indicate the limits thereof, and in which the parts given are by weight unless otherwise indicated. It is to be noted that certain rubber-resin blends according to this invention have outstanding combinations of physical properties. Particularly to be noted are samples 4, 5 and 6 of Table I, samples 6, 7 and 8 of Table II, samples 2 and 3 of Table III, samples 1, 6 and 8 of Table V and samples 3 and 4 of Table VIII.

In these examples the rubbery polymers were prepared by the following method. 166 parts of water were placed in an autoclave with 0.3 part of potassium persulphate catalyst and a suitable emulsifier, and 25 parts of the non-volatile monomer phase added. This included, in typical examples, 15 parts of styrene or methyl methacrylate, 0.4 part of mercaptan modifier, and 10 parts of vinyl pyridine or methacrylic acid. The autoclave was purged to remove oxygen and about 75 parts of butadiene gas passed in. The reaction was allowed to continue with agitation at around 45–50° C. for about 16 hours. The resulting latex was coagulated and the polymer cake dried by warm air. In a similar manner high styrene resins were prepared by reversing the proportion of butadiene and styrene.

Certain of the hard saturated polymers were prepared by a similar emulsion technique e.g. Example 1, while the remainder were prepared by bulk polymerisation wherein the specified parts of liquid monomers and 0.25% to 0.5% of a suitable initiator, and optionally 0.5% of lauryl mercaptan as modifier, were mixed between two glass plates and the whole heated overnight in an oven to 65–80° C. and finally to 120° C. for 6 hours. The result was a sheet of copolymeric material 1/8 inch thick which was broken up for subsequent blending.

The following abbreviations are used in the examples:

Aam—acrylamide
AA—acrylic acid
B—butadiene
DMAEMA—N,N-dimethylaminoethyl methacrylate
EA—ethyl acrylate
M—methyl methacrylate
MA—methyl acrylate
MAA—methacrylic acid
MAam—methacrylamide
VC—vinylchloride
S—styrene
V—vinylpyridine In the tables the polymers are normally referred to by their constituent monomers: for example, B/M/MAA is a rubbery copolymer containing butadiene, methyl methacrylate and methacrylic acid, whereas M/MAA is a resinous copolymer of methyl methacrylate and methacrylic acid, and S and M standing alone refer to polystyrene and poly(methyl methacrylate).

EXAMPLE 1

The following ingredients were charged into a stirred autoclave:

| | Parts |
|---|---|
| Methyl methacrylate | 15 |
| 2-vinylpyridine | 10 |
| Lauryl mercaptan | 0.4 |
| Sodium lauryl sulphate | 5.5 |
| Potassium persulphate | 0.3 |
| Divinylbenzene | 1.0 |
| Water | 226 |

The autoclave was purged to remove oxygen, and 75 parts of butadiene-1,3 were passed in. The autoclave was then maintained at 50° C. until about 75% conversion to polymer had occured, when the reaction was stopped. The resulting rubbery copolymer was coagulated, washed and dried.

A resinous copolymer was prepared in a similar way by charging the following materials to an autoclave and maintaining at 50° C. until about 95–100% conversion to copolymer had occurred. The copolymer was coagulated, washed and dried.

|   | Parts |
|---|---|
| Styrene | 90 |
| Methacrylic acid | 10 |
| Lauryl mercaptan | 0.1 |
| Dodecylamine hydrochloride | 3 |
| Potassium persulphate | 0.2 |
| Water | 150 |

A blend of the two copolymers was prepared by masticating 70 parts of the resinous copolymer and 30 parts of the rubbery copolymer on a heated two roll mill. The blend had a heat distortion temperature of 83.5° C. as measured by A.S.T.M. method No. D 648–45T and a notched Hounsfield impact strength of 0.26 foot pound.

EXAMPLE 2

In Table I illustrations are given of blends of polystyrene and a butadiene/methyl methacrylate (75/25) rubbery copolymer over a different range of proportions. The blends were made on a heated two-roll mill and the milling properties characterized visually.

*Table I*

| Blend composition | | No. 1/No. 2 ratio | Milling properties | Yield stress, p.s.i. | Elongation, percent | Energy to break, ft.-lb./cu. in. | Vicat softening point, °C. |
|---|---|---|---|---|---|---|---|
| No. 1 polymer | No. 2 polymer | | | | | | |
| S | B/M | 80/20 | Fair | 4,860 | 2.5 | 3.3 | |
| S | B/M | 75/25 | do | 3,500 | 2.2 | 4.0 | |
| S | B/M | 70/30 | do | 3,400 | 14.0 | 18.5 | |
| S/V–90/10 | B/M/MAA | 80/20 | Very good | 6,620 | 3.2 | 12.5 | 94.5 |
| S/V–90/10 | B/M/MAA | 75/25 | do | 6,120 | 9.9 | 23.0 | 96.2 |
| S/V–90/10 | B/M/MAA | 70/30 | do | 6,180 | 32.0 | 88.0 | 87.6 |

EXAMPLE 3

In Table II are shown the results of milling (under conditions similar to Example 2) polyvinyl chloride, vinyl chloride copolymers containing different specified monomers and blends of these with various butadiene/methyl methacrylate rubbery copolymers. Particular improvements are shown in the milling properties and in the notched impact resistance by the well-known Hounsfield test shown in Column 8.

The PVC copolymers were prepared by the following method:

VC/AAM

Ingredients:
| | | |
|---|---|---|
| Water | g | 2300 |
| Ammonium persulphate | g | 4.0 |
| Sodium methyl oleate sulphonate | ml | 80 |
| Sodium sulphite | g | 4.0 |
| Vinylchloride | g | 1080 |
| Acrylamide | g | 120 |

VC/MAA

Ingredients:
| | | |
|---|---|---|
| Water | g | 2300 |
| Ammonium persulphate | g | 5.0 |
| Sodium methyl oleate sulphonate | ml | 65.7 |
| Sodium metabisulphite | g | 2.5 |
| Vinylchloride | g | 990 |
| Methacrylic acid | g | 110 |

In each case 1580 cc. of water and the ammonium persulphate were placed in an autoclave and flushed with nitrogen. When the added monomer was acrylamide, the vinyl chloride was introduced alone under pressure and the autoclave heated to 50° C. Then 200 g. of water, the sodium sulphite and a portion of the surface active agent were added, and the remaining water, surfactant and the acrylamide were added lotwise over 2½ hours. The reaction time was 340 minutes and the yield virtually 100%.

For the acid containing polymer the method was similar save that 9.9 g. of acid were added with the vinyl chloride and the rest added over a 2 hour period.

*Table II*

| Blend composition | | No. 1/No. 2 ratio | Milling properties | Yield stress, p.s.i. | Elongation, percent | Energy to break, ft.-lb./cu. in. | Hounsfield, ft.-lbs. | Vicat softening point, °C. |
|---|---|---|---|---|---|---|---|---|
| No. 1 polymer | No. 2 polymer | | | | | | | |
| VC | | | Fair | 11,400 | 26.0 | 132 | .02 | 95 |
| VC/Aam–90/10 | | | do | ~10,000 (broke) | 3.5 | ~25 | .002 | 109 |
| VC/MAA–90/10 | | | Poor | 11,950 | ~20.0 | ~190 | .002 | 100 |
| VC | B/M | 90/10 | do | 6,770 | 16.0 | 55 | .06 | 85 |
| VC | B/M | 85/15 | do | 4,050 | 7.6 | 14 | .03 | 83 |
| VC/MAA–90/10 | B/M/V | 95/5 | Very good | 9,000 | 42.0 | 274 | .18 | 96 |
| VC/MAA–90/10 | B/M/V | 90/10 | do | 8,180 | 43.0 | 200 | .40 | 103 |
| VC/MAA–90/10 | B/M/V | 85/15 | do | 6,400 | 41.0 | 157 | .56 | 90 |
| VC/Aam–90/10 | B/M/MAA | 95/5 | do | 10,500 | 28.0 | 199 | .093 | 104 |
| VC/Aam–90/10 | B/M/MAA | 90/10 | do | 8,250 | 25.0 | 156 | .090 | 91 |
| VC/Aam–90/10 | B/M/MAA | 85/15 | do | 6,700 | 26.5 | 125 | .082 | 90 |
| VC | B/M/V | 90/10 | Fair | 6,700 | 16.0 | 80 | .082 | 85 |
| VC | B/M/MAA | 90/10 | do | 6,000 | 6.0 | 20 | .031 | 86 |

EXAMPLE 4

Table III illustrates results for blends of polystyrene and a butadiene/styrene rubbery copolymer and blends according to this invention wherein only 5% of two different basic specified monomers was included in the polymers. A similar comparison is included for poly(methyl methacrylate) and a butadiene/methyl methacrylate rubbery copolymer; in this case the acidic specified monomer was included in the resinous copolymer and the basic one in the rubber.

Table III

| Blend composition | | No. 1/No. 2 ratio | Milling properties | Yield stress, p.s.i. | Elongation, percent | Energy to break, ft.-lb./cu. in. | Hounsfield, ft.-lbs. | Vicat softening point, °C. |
|---|---|---|---|---|---|---|---|---|
| No. 1 polymer | No. 2 polymer | | | | | | | |
| S | B/S | 70/30 | Poor | Too weak | | 6 | 13 | .16 | |
| S/V-95/5 | B/S/MAA | 70/30 | Very good | 3,500 | 6 | 13 | .16 | 101 |
| S/V-95/5 | B/S/MAA | 65/35 | do | 3,450 | 11 | 24 | .24 | 100 |
| S/DMAEMA-95/5 | B/S/MAA | 70/30 | do | 3,100 | 6 | 6 | .074 | |
| M | B/MA | 75/25 | Good | 1,150 | 122 | 106 | .040 | |
| M/MAA-90/10 | B/M/V | 75/25 | do | 3,800 | 37 | 77 | .010 | |

EXAMPLE 5

Table IV shows the properties of blends of resinous saturated linear polymers only. Milling conditions were similar to those of Example 2. Where milling properties are indicated as "none," the addition of the second polymer to the one already in the mill caused the whole mass to fall off the rolls. It is seen that materials believed hitherto to be as incompatible as polystyrene and poly(methyl methacrylate) can now be blended to give a transparent blend.

Table IV

| Blend composition | | No. 1/No. 2 ratio | Milling properties | Appearance | Flexural strength, p.s.i. | Energy to break, ft.-lb./cu. in. | Vicat softening point, °C. |
|---|---|---|---|---|---|---|---|
| No. 1 polymer | No. 2 polymer | | | | | | |
| M | S | 50/50 | Doughy | Opaque | 5-10,000 | 0.3-0.7 | 106.5 |
| M/MAA-90/10 | S/MAam-90/10 | 50/50 | Very good | Transparent | 4,500 | 0.25 | 123.0 |
| M/MAam-90/10 | S/MAA-90/10 | 50/50 | do | do | 4,300 | 0.1 | 127.5 |
| M | EA | 75/25 | None | | | | |
| M/V-90/10 | EA/MAA-90/10 | 75/25 | Good | Clear, brown | 12,600 | 1.40 | 101.5 |
| S | EA | 60/40 | Doughy | Opaque, sticky | 5,250 | 0.36 | |
| S/V-90/10 | EA/MAA-90/10 | 75/25 | Very good | Clear | 3,800 | 0.17 | 98.0 |
| S/MAam-90/10 | EA/MAA-90/10 | 60/40 | do | do | 3,950 | 0.15 | |
| BMA | EA | 75/25 | Good | Cloudy | | | |
| BMA/MAA-90 | EA/MAam-90/10 | 75/25 | do | Clear | | | |

EXAMPLE 6

In Table V are shown the results of milling further styrene resinous copolymers with butadiene/methyl methacrylate rubbery copolymers, each containing specified monomers. The last two results show the blending of a high styrene/butadiene copolymer with other rubbery copolymers.

EXAMPLE 7

Two ethylene copolymers were prepared by the well-known high pressure process using a peroxide catalyst. The first contained a ratio of 10.5 moles of ethylene to 1 mole of N-vinyl phthalimide (NVP) and the second contained ethylene and 7% by weight of 2-vinyl pyridine. They were blended respectively with a styrene resinous copolymer containing methacrylic acid and a high styrene/butadiene copolymer similarly modified. The results are shown in Table VI.

Table VI

| Blend composition | | No. 1/No. 2 ratio | Milling properties | Yield stress, p.s.i. | Elongation, percent | Energy to break, ft.-lb./cu. in. |
|---|---|---|---|---|---|---|
| No. 1 polymer | No. 2 polymer | | | | | |
| Polythene | Polystyrene | 13/7 | Very poor | 1,000 | | |
| Ethylene/NVP | S/MAA | 13/7 | Good | 1,900 | | 41 |
| S/B/MAA-75/15/10 | Ethylene/VP-93/7 | 10/5 | Very good | 7,600 | 24 | 84 |

EXAMPLE 8

A vinyl chloride/methacrylic acid (90/10) copolymer was prepared as in Example 3 and blended on a roll mill at about 160° C. with two polyesteramide plasticizers. The latter were prepared from the following monomers:

*Polyesteramide 1:* from ethylene glycol (3 moles) monoethanolamine (1 mole) and adipic acid, mol. wt. about 5000.

*Polyesteramide 2:* from adipic acid and from ethylene glycol, diethylene glycol and monoethanolamine in molar ratios 90:5:5, mol. wt. about 2000 (contained less amide than Polyesteramide 1).

Table V

| Blend composition | | No. 1/No. 2 ratio | Milling properties | Yield stress, p.s.i. | Elongation, percent | Energy to break, ft.-lb./cu. in. | Hounsfield, ft.-lbs. | Vicat softening point, °C. |
|---|---|---|---|---|---|---|---|---|
| No. 1 polymer | No. 2 polymer | | | | | | | |
| S/MAA-90/10 | B/M/V | 75/25 | Fair | 4,500 | 25 | 64 | .30 | 109 |
| S/MAA-90/10 | B/M/V | 70/30 | do | 3,050 | 18 | 36 | .28 | 106 |
| S/MAA-90/10 | B/M/V | 65/35 | do | 2,500 | 33 | 60 | .54 | 101 |
| S/MAam-90/10 | B/M/MAA | 70/30 | Good | 5,350 | 12 | 30 | .05 | 97 |
| S/MAam-90/10 | B/M/MAA | 65/35 | do | 5,350 | 24 | 70 | .05 | 92 |
| S/MAam-90/10 | B/M/MAA | 60/40 | do | 4,450 | 36 | 89 | .24 | 88 |
| S/MAam-90/10 | B/M/MAA | 50/50 | Fair | 3,110 | 89 | 220 | .56 | 79 |
| S/B/MAA | B/M/DMAEMA | 75/25 | Very good | 5,200 | 34 | 122 | .35 | 84 |
| S/B/MAA | B/S/DMAEMA | 75/25 | do | 4,900 | 11 | 26 | .14 | 82 |

The polymeric plasticisers showed excellent compatability, a good reduction in Young's modulus, and no tendency to migrate to the surface of the vinyl chloride polymer.

Table VII

| Blend composition | | No. 1/No. 2 ratio | Milling properties | Appearance | Yield stress | Young's modulus |
|---|---|---|---|---|---|---|
| No. 1 polymer | No. 2 polymer | | | | | |
| VC/MAA | Polyesteramide 1 | 80/20 | Very good | Slightly opaque | 6,450 | $2.07 \times 10^5$ |
| VC/MAA | Polyesteramide 2 | 80/20 | do | Clear | 4,500 | $1.22 \times 10^5$ |
| VC/MAA | None | | Poor | Clear but colored | 5,200 | $4.94 \times 10^5$ |

EXAMPLE 9

Samples of a standard mixed nylon molding resin, the properties of which are given in sample 1 of Table VIII, were blended with styrene and methyl methacrylate polymers modified with a specified monomer. Results of tests of such blends and also of further blends with methyl methacrylate rubbery polymers, both modified and not, are given in Table VIII. The nylon resin was a mixture of 40 parts nylon 6:6, 30 parts nylon 6:10 and 30 parts nylon 6.

Table VIII

| Blend composition | | No. 1/No. 2 ratio | Milling properties | Appearance of 1/8" sheet | Yield stress, p.s.i. | Elongation, percent | Energy to break ft.-lb./cu. in. | Vicat softening point | | Hounsfield, ft.-lbs. |
|---|---|---|---|---|---|---|---|---|---|---|
| No. 1 polymer | No. 2 polymer | | | | | | | 1/10 | V.S.P. | |
| 1 Nylon | | | Good | Clear | 7,800 | 125 | 522 | 120 | 146 | .024 |
| 2 Nylon | S/MAA-90/10 | 80/20 | Fair | Opaque | 8,350 | | | 115 | 147 | .017 |
| 3 Nylon | B/M/MAA | 80/20 | Very good | Slight haze | 5,500 | 180 | 690 | 107 | 144 | 1.02 |
| 4 Nylon | B/M/MAA | 90/10 | do | do | 7,700 | 97 | 316 | 120 | 150 | .28 |
| 5 Nylon | B/M/MAA | 95/5 | do | do | 5,600 | | | 111 | 142 | .046 |
| 6 Nylon | B/M | 80/20 | Poor | Cloudy | 4,850 | 164 | 578 | 114 | 142 | .62 |
| 7 Nylon | B/M | 90/10 | Fair | do | 6,500 | 126 | 521 | 114 | 147 | .15 |
| 8 Nylon | B/M | 95/5 | do | do | 7,900 | 40 | 210 | 116 | 147 | .034 |

What we claim is:

1. A process for preparing a homogeneous blend of synthetic polymeric materials which comprises: providing a first ethylenically unsaturated neutral monomer whose polymer is normally substantially incompatible with the polymer of a second ethylenically unsaturated neutral monomer; forming a substantially linear copolymer by copolymerizing from 98 to 50 parts by weight of said first monomer with from 2 to 50 parts by weight of a copolymerizable ethylenically unsaturated monomer containing at least one atom selected from the group consisting of basic nitrogen atoms and amido nitrogen atoms; forming another substantially linear copolymer by copolymerizing from 98 to 50 parts by weight of said second monomer with from 2 to 50 parts by weight of an $\alpha,\beta$-ethylenically unsaturated carboxylic acid; and blending said copolymers in coagulated dried form by mechanical mastication.

2. A process as claimed in claim 1 wherein both copolymers are hard and resinous and the neutral monomers thereof are selected from the group consisting of styrene, vinyl toluene, methyl methacrylate, butyl methacrylate, ethylene, propylene, acrylate esters of lower aliphatic alcohols, vinyl chloride and minor proportions of butadiene, acrylonitrile and methacrylonitrile.

3. A process for preparing a homogeneous molding polymeric composition which comprises: forming by copolymerization a rubbery synthetic copolymer containing a major proportion of butadiene-1,3 and a hard resinous synthetic copolymer containing at least one copolymerizable monoethylenically unsaturated neutral monomer whose polymer is normally substantially incompatible with a polymer of butadiene-1,3, one of said copolymers including from 4 to 12% by weight of a copolymerizable $\alpha,\beta$-ethylenically unsaturated carboxylic acid and the other of said copolymers including from 5 to 15% by weight of a copolymerizable ethylenically unsaturated monomer containing at least one atom selected from the group consisting of basic nitrogen atoms and amido nitrogen atoms; and blending by mechanical mastication from 50 to 10 parts of said rubbery copolymer with from 50 to 90 parts of said resinous copolymer, said copolymers being in coagulated dried form.

4. A process for preparing a homogeneous blend of synthetic materials which comprises: forming by copolymerization a hard resinous synthetic copolymer containing a major proportion of vinyl chloride and a rubbery synthetic copolymer containing a major proportion of butadiene-1,3, one of said copolymers including at least 2% by weight of a copolymerizable $\alpha,\beta$-ethylenically unsaturated carboxylic acid and the other of said copolymers including at least 2% by weight of a copolymerizable ethylenically unsaturated monomer containing at least one atom selected from the group consisting of basic nitrogen atoms and amido nitrogen atoms; and blending said copolymers in coagulated dried form by mechanical mastication.

5. A process for preparing a homogeneous blend of synthetic polymeric materials which comprises: providing an ethylenically unsaturated neutral monomer whose polymer is normally substantially incompatible with a synthetic linear polyamide; forming a substantially linear copolymer by copolymerizing from 98 to 50 parts by weight of said monomer with from 2 to 50 parts by weight of an $\alpha,\beta$-ethylenically unsaturated carboxylic acid; and blending said polyamide and said copolymer in coagulated dried form by mechanical mastication.

6. A process for preparing a homogeneous blend of synthetic polymeric materials which comprises: providing an ethylenically unsaturated neutral monomer whose polymer is normally substantially incompatible with a synthetic linear polyamide; forming a substantially linear copolymer by copolymerizing from 98 to 50 parts by weight of said monomer with from 2 to 50 parts by weight of an $\alpha,\beta$-ethylenically unsaturated carboxylic acid; and blending from 1 to 99 parts of said polyamide and from 99 to 1 parts of said copolymer in coagulated dried form by mechanical mastication.

7. A process as claimed in claim 6 wherein the substantially linear copolymer is a rubbery copolymer containing a major proportion of butadiene-1,3.

8. A process as claimed in claim 6 wherein the polyamide is a polyesteramide plasticizer and the substantially linear copolymer is a hard resinous copolymer containing a major proportion of vinyl chloride.

References Cited by the Examiner

UNITED STATES PATENTS

| | | | |
|---|---|---|---|
| 2,265,559 | 12/1941 | Watkins | 260—857 |
| 2,524,045 | 10/1950 | Flory | 260—857 |
| 2,614,093 | 10/1952 | Wheelock | 260—29 |
| 2,807,597 | 9/1957 | Sonnenfeld et al. | 260—894 |
| 2,844,562 | 7/1958 | Ingram | 260—30.6 |
| 2,952,043 | 9/1960 | Uraneck et al. | 260—894 |

MURRAY TILLMAN, *Primary Examiner.*

DANIEL ARNOLD, LEON J. BERCOVITZ, WILLIAM H. SHORT, *Examiners.*